United States Patent
Andersen et al.

(10) Patent No.: US 12,270,371 B2
(45) Date of Patent: Apr. 8, 2025

(54) PITCH SYSTEM FOR A WIND TURBINE BLADE

(71) Applicant: Vestas Wind Systems A/S, Aarhus N (DK)

(72) Inventors: Lasse Godballe Andersen, Hjortshøj (DK); Erik Garde, Randers SV (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/565,156

(22) PCT Filed: Jun. 8, 2022

(86) PCT No.: PCT/DK2022/050122
§ 371 (c)(1),
(2) Date: Nov. 29, 2023

(87) PCT Pub. No.: WO2022/268277
PCT Pub. Date: Dec. 29, 2022

(65) Prior Publication Data
US 2024/0271595 A1   Aug. 15, 2024

(30) Foreign Application Priority Data

Jun. 23, 2021 (DK) .......................... PA 2021 70321

(51) Int. Cl.
*F03D 1/06* (2006.01)
*F03D 7/02* (2006.01)

(52) U.S. Cl.
CPC ......... *F03D 1/0664* (2023.08); *F03D 7/0224* (2013.01); *F05B 2260/507* (2013.01); *F05B 2270/60* (2013.01)

(58) Field of Classification Search
CPC .... F03D 1/0664; F03D 1/0667; F03D 1/0669; F03D 1/067; F03D 7/0224;
(Continued)

(56) References Cited

U.S. PATENT DOCUMENTS

| 4,384,511 | A | 5/1983 | Mefferd |
| 6,279,661 | B1 * | 8/2001 | Matherne, Jr. ............ B66C 1/66 166/242.1 |

(Continued)

FOREIGN PATENT DOCUMENTS

| CN | 106438574 A | 2/2017 |
| CN | 111637019 A | 9/2020 |

(Continued)

OTHER PUBLICATIONS

International Searching Authority, International Search Report and Written Opinion issued in corresponding PCT Application No. PCT/DK2022/050122, dated Sep. 5, 2022.

(Continued)

*Primary Examiner* — David E Sosnowski
*Assistant Examiner* — Jason G Davis
(74) *Attorney, Agent, or Firm* — Wood Herron & Evans LLP

(57) ABSTRACT

A pitch actuator for a wind turbine pitch system, the pitch actuator having an actuator rod, a drive end of which is defined by a clevis fork arrangement having first fork member and a second fork member that extend in a direction along a rod axis and terminate at a tip end. The first and second fork members define respective clevis openings for receiving a clevis pin therethrough, said clevis openings each having an opening perimeter profile comprising: a first perimeter section defined by a leading circular arc that is centred on the rod axis and oriented in the direction of the tip end of the fork members, the circular arc defining a nominal radius and a central angle of less than 120 degrees, and second and third flared perimeter sections that flank respective sides of the first perimeter section, each of which define an enlarged clearance zone with respect to at least part of an imaginary circle defined by the nominal radius of the (Continued)

first perimeter section. A benefit of the invention is that the enlarged clearance zones defined by the flared perimeter sections create an area where there is no contact between the perimeter of the openings and the outer surface of the clevis pin. This provides a stress relieving function since deformation of the openings in use, due to force applied along the axis of the actuator rod, does not create a point of stress combined with sliding or rubbing movement with the sides of the clevis pin, thereby reducing wear and fatigue. The invention extends to a pitch system including such a pitch actuator and a wind turbine incorporating such a pitch system.

18 Claims, 9 Drawing Sheets

(58) Field of Classification Search
CPC ............ F05B 2260/507; F05B 2270/60; F05B 2270/602; F05B 2270/604; F05B 2270/605; F05B 2270/606
See application file for complete search history.

(56) References Cited

U.S. PATENT DOCUMENTS

| | | | |
|---|---|---|---|
| 9,121,385 B2 * | 9/2015 | Andersen | F03D 1/0658 |
| 9,272,781 B2 * | 3/2016 | Day | B64C 27/605 |
| 9,624,966 B1 * | 4/2017 | Obleman | H01Q 3/04 |
| 10,612,516 B2 | 4/2020 | Ebbesen et al. | |
| 2012/0134806 A1 | 5/2012 | Andersen et al. | |

FOREIGN PATENT DOCUMENTS

| | | |
|---|---|---|
| EP | 2781660 A1 | 9/2014 |
| EP | 2769089 B1 | 6/2017 |
| WO | 2013000041 A1 | 1/2013 |

OTHER PUBLICATIONS

Danish Patent and Trademark Office, examination report issued in corresponding DK Application No. PA 2021 70321, dated Dec. 7, 2021.

* cited by examiner

PITCH SYSTEM FOR A WIND TURBINE BLADE

TECHNICAL FIELD

The present invention relates generally to wind turbines, to a pitch system for use in such wind turbines, and to a pitch ring assembly.

BACKGROUND

Wind turbines typically include a rotor with large blades driven by the wind. The blades convert the kinetic energy of the wind into rotational mechanical energy. Typically, the mechanical energy is transferred via a drive train to a generator, which then converts the energy into electrical power.

Most modern wind turbines control power output by pitching the blades relative to the wind. Therefore, each blade is mounted to a hub by a pitch system that allows relative rotational movement between the blade and the hub. The pitch system comprises a pitch bearing, which typically includes concentric inner and outer bearing rings. One of the bearing rings (either the inner or the outer ring) is attached to the blade and the other is attached to the hub.

The pitch system also includes a drive system comprising one or more pitch drive devices such as electric motors or hydraulic or electric linear actuators. The drive devices are used to turn the bearing ring attached to the blade relative to the bearing ring attached to the hub in order to adjust the pitch of the blade by turning the blade about its longitudinal axis.

An example of a pitch system for a wind turbine blade is described in the applicant's prior PCT application WO 2012/069062. FIG. 1 shows an exploded perspective view of the prior art pitch system described in WO 2012/069062. Referring to FIG. 1, the pitch system 20 includes a bearing 22, first and second coupling members 24, 26, and a drive system 28. More specifically, the bearing 22 includes an inner bearing ring 30 mounted to the hub 6 and an outer bearing ring 32 mounted to the blade. The first coupling member 24 is positioned between the hub 6 and the inner bearing ring 30. The second coupling member 26 is positioned between the blade and outer bearing ring 32. The drive system 28 comprises hydraulic actuators 34, which are connected to the first and second coupling members 24, 26 so that the drive system 28 can rotate the inner bearing ring 30 relative to the outer bearing ring 32 and thereby pitch the blade relative to the hub 6.

The first and second coupling members 24, 26 shown in FIG. 1 each comprise a pitch ring for attaching to a respective bearing ring 30, 32. The first coupling member 24 further includes a plate, whilst the second coupling member 26 includes a cross-beam. The plate and cross-beam of the respective coupling members 24, 26 provide mounting points for the hydraulic actuators 34. In addition to providing mounting points for the actuators 34, one or both of the coupling members 24, 26 may be designed to alleviate loads in the bearing rings 30, 32, for example to ensure that loads are distributed evenly around the circumferences of the bearing rings 30, 32. Notably, for example, the plate-like first coupling member 24 is generally circular and spans the central region of the inner bearing ring 30, to provide support to the inner bearing ring 30 to guard against ovalisation due to forces exerted on the inner bearing ring 30 during use. This prevents uneven wearing of the bearing rings 30, 32 and extends the service life of the pitch bearing 22.

Over time there has been a significant increase in the overall size of wind turbine blades because of the desire to capture more of the available energy from the wind. For instance, the root diameter of existing utility-scale wind turbine blades is in excess of 4.5 metres, and this is set to increase further in the future as blade sizes become ever larger. Larger blades require larger pitch system components, such as bearing rings and actuators, in order to support the blades and control pitching movement. However, this increase in size of pitch system components is generally accompanied by a corresponding increase in the mass. With the general aim of mass reduction of components, it is desirable to avoid increasing the mass of the pitch system in proportion with increasing the blade size. It is against this background that the invention has been devised.

SUMMARY OF THE INVENTION

In accordance with one aspect of the invention, the invention provides a pitch actuator for a wind turbine pitch system, the pitch actuator having an actuator rod, a drive end of which is defined by a clevis fork arrangement having first fork member and a second fork member that extend in a direction along a rod axis and terminate at a tip end. The first and second fork members define respective clevis openings for receiving a clevis pin therethrough, said clevis openings each having an opening perimeter profile comprising: a first perimeter section defined by a leading circular arc that is centred on the rod axis and oriented in the direction of the tip end of the fork members, the circular arc defining a nominal radius and a central angle of less than 120 degrees, and second and third flared perimeter sections that flank respective sides of the first perimeter section, each of which define an enlarged clearance zone with respect to at least part of an imaginary circle defined by the nominal radius of the first perimeter section.

A benefit of the invention is that the enlarged clearance zones defined by the flared perimeter sections create an area where contact between the perimeter of the openings and the outer surface of the clevis pin is avoided. This provides a stress relieving function since deformation of the openings caused by force applied along the axis of the actuator rod does not create a point of stress combined with sliding or rubbing movement with the sides of the clevis pin, thereby reducing wear and fatigue.

The invention extends to a pitch system for rotating a blade of a wind turbine relative to a hub, the pitch system comprising a blade bearing including an inner bearing ring and an outer bearing ring, wherein the outer bearing ring is rotatable relative to the inner bearing ring, and an actuator system configured to control relative rotational movement between the inner bearing ring and outer bearing ring. The actuator system comprises a pitch actuator as defined above, wherein the actuator rod of the pitch actuator is coupled to one of the inner bearing ring or the outer bearing ring at a connection bracket, wherein the connection bracket comprises a blade member received between the first and second fork members of the actuator rod, and which defines a clevis opening which is aligned with the respective openings provided in the first and second fork members, and wherein a clevis pin extends through the respective clevis openings of the first and second fork members and the blade member. The invention also extends to a wind turbine incorporating such a pitch system.

In one embodiment, the opening perimeter profile may further comprise a fourth perimeter section defined by a trailing circular arc that is centred on the rod axis, and which is flanked by the second and third flared perimeter sections. The fourth perimeter section may be substantially identical, albeit a mirror image of, the first perimeter section such that the curve radius of the fourth perimeter section matches the nominal radius of the first perimeter section. Usefully, such a configuration means that the openings in the fork members are in effect circular with flared sections cut out from the walls of the circular openings.

Usefully, the drive end of the pitch actuator is configured to be removable from the actuator rod which facilitates maintenance activities. Another aspect that enhances maintainability of the pitch actuator is that, in one embodiment, the dimensions of the clevis fork arrangement, when considered in a plane perpendicular to the rod axis, do not exceed the dimensions of the actuator rod, wen considered in a parallel plane. Therefore, annular components such as seals may be removed from the pitch actuator by sliding them over the actuator rod and the clevis fork arrangement during maintenance, for example.

Further optional and advantageous features are referenced in the detailed description and the appended claims.

Figure 2:
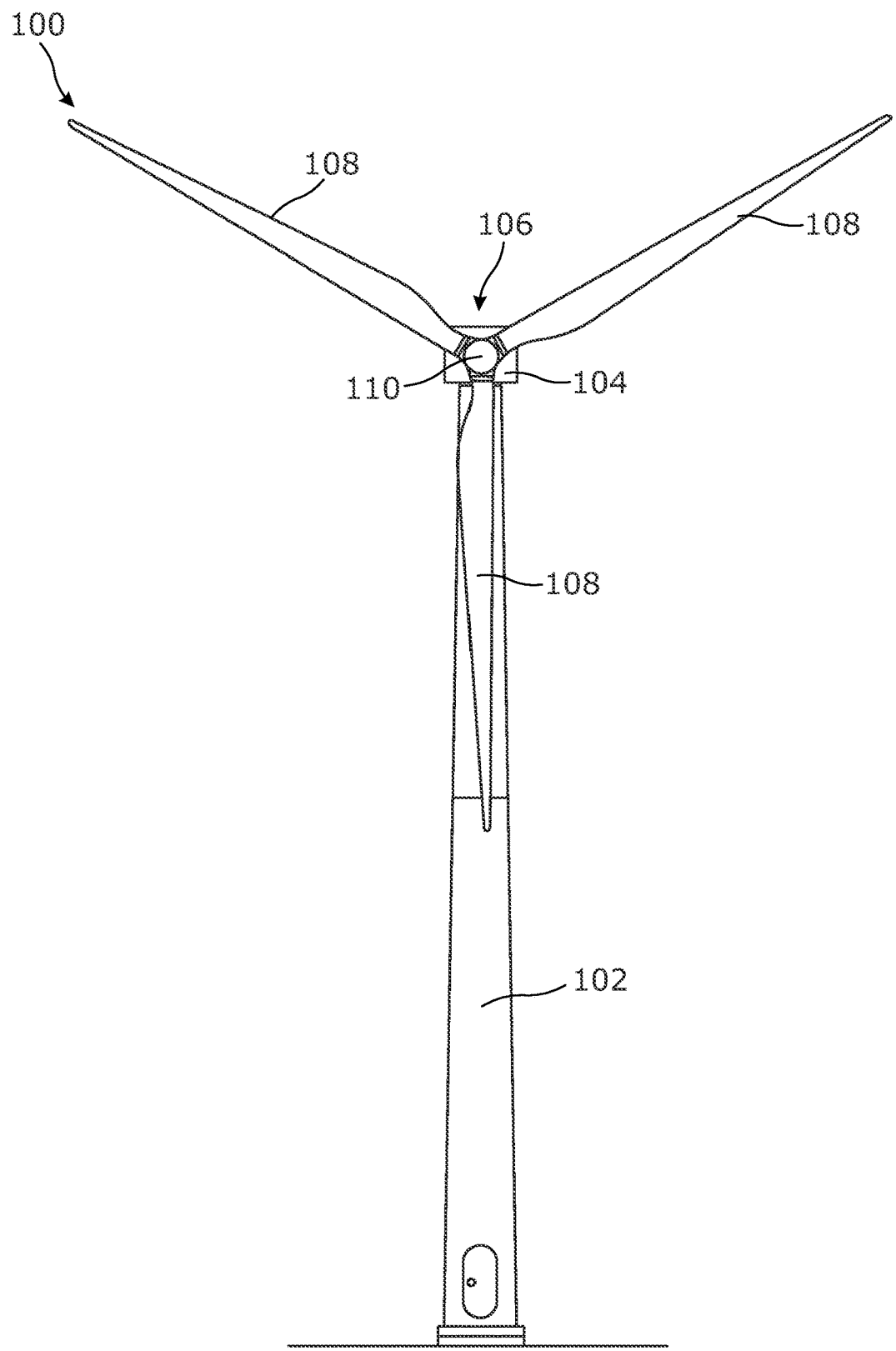
Figure 3:
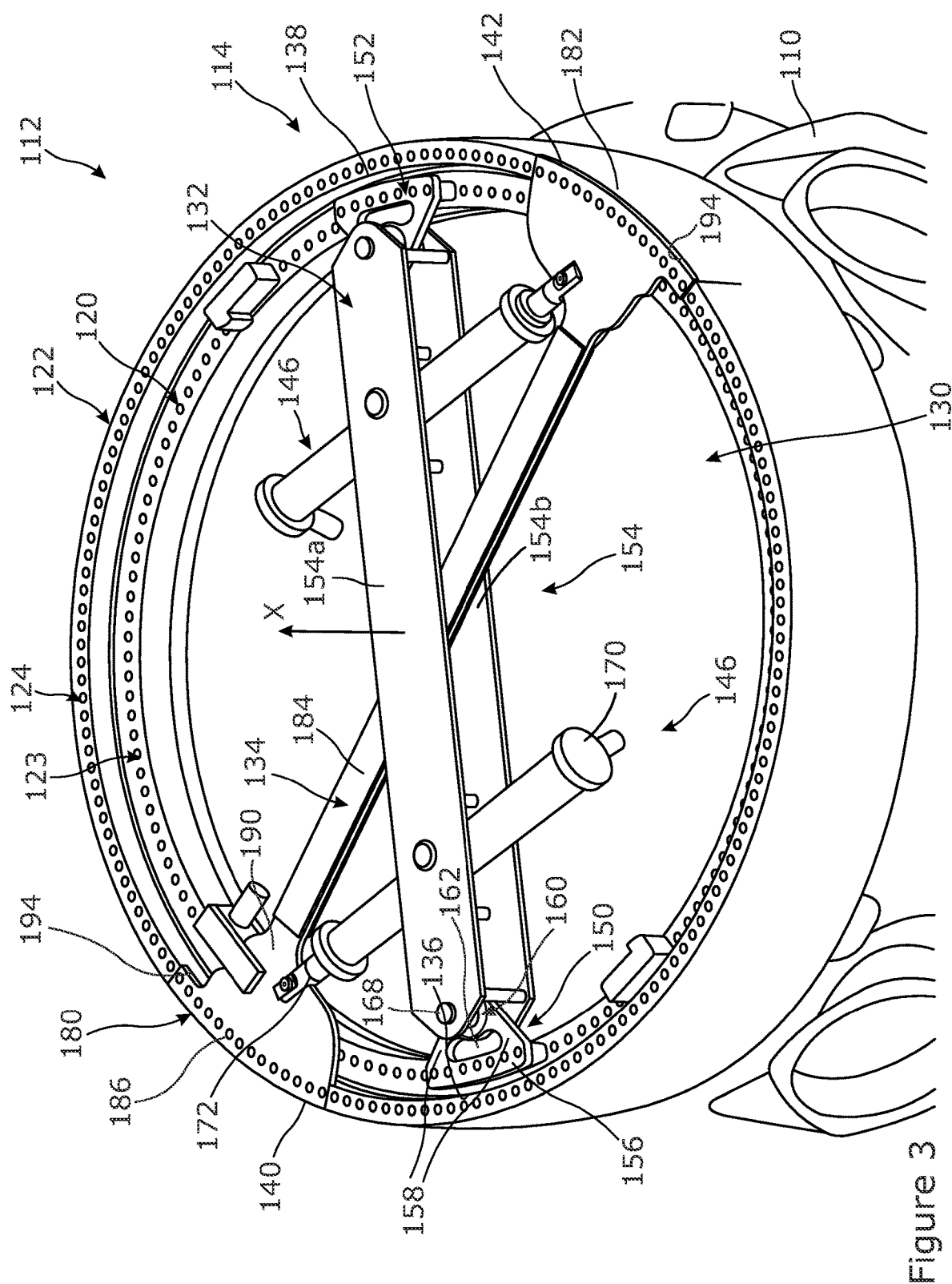
Figure 4:
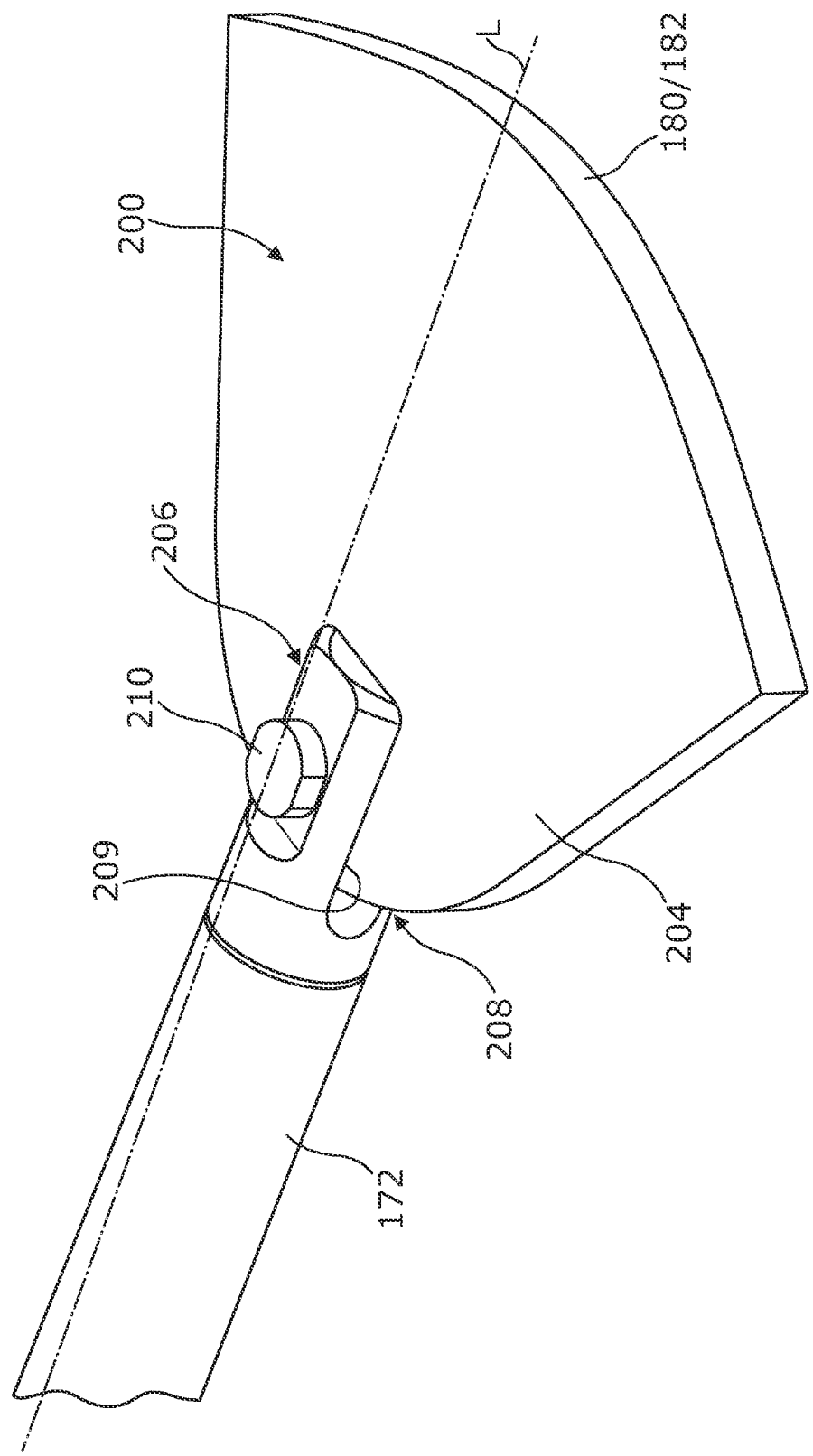
Figure 5:
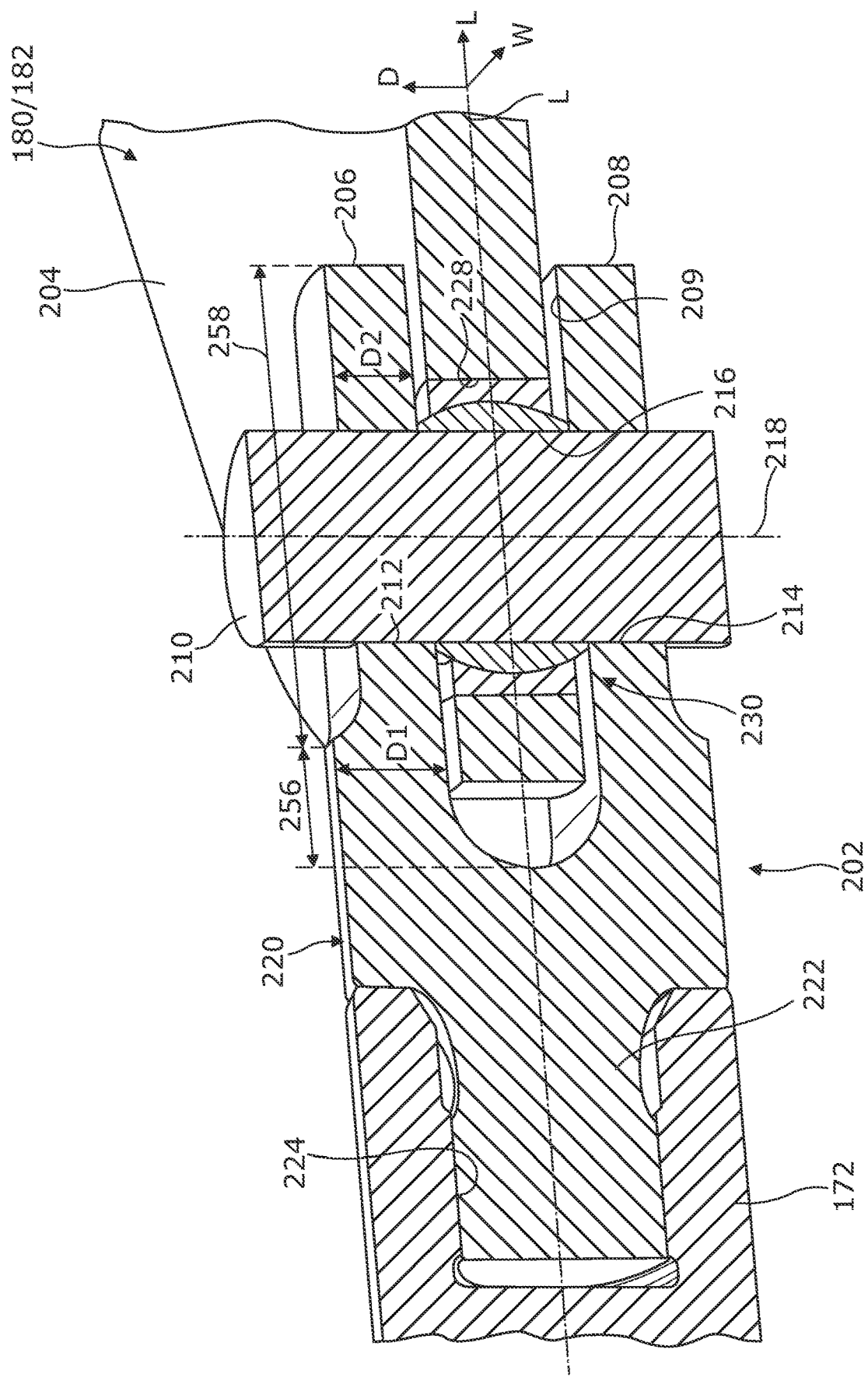
Figure 6:
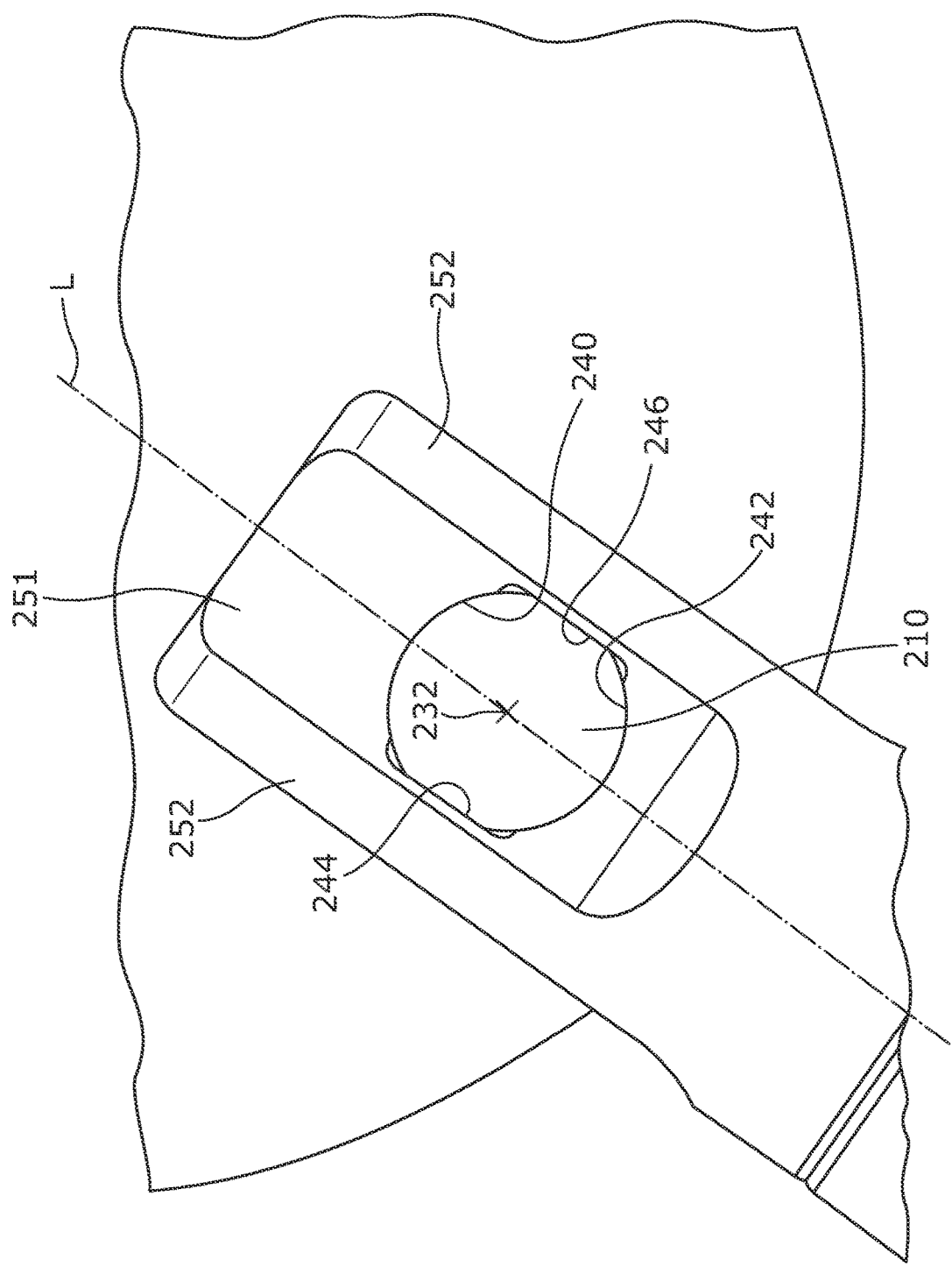
Figure 7:
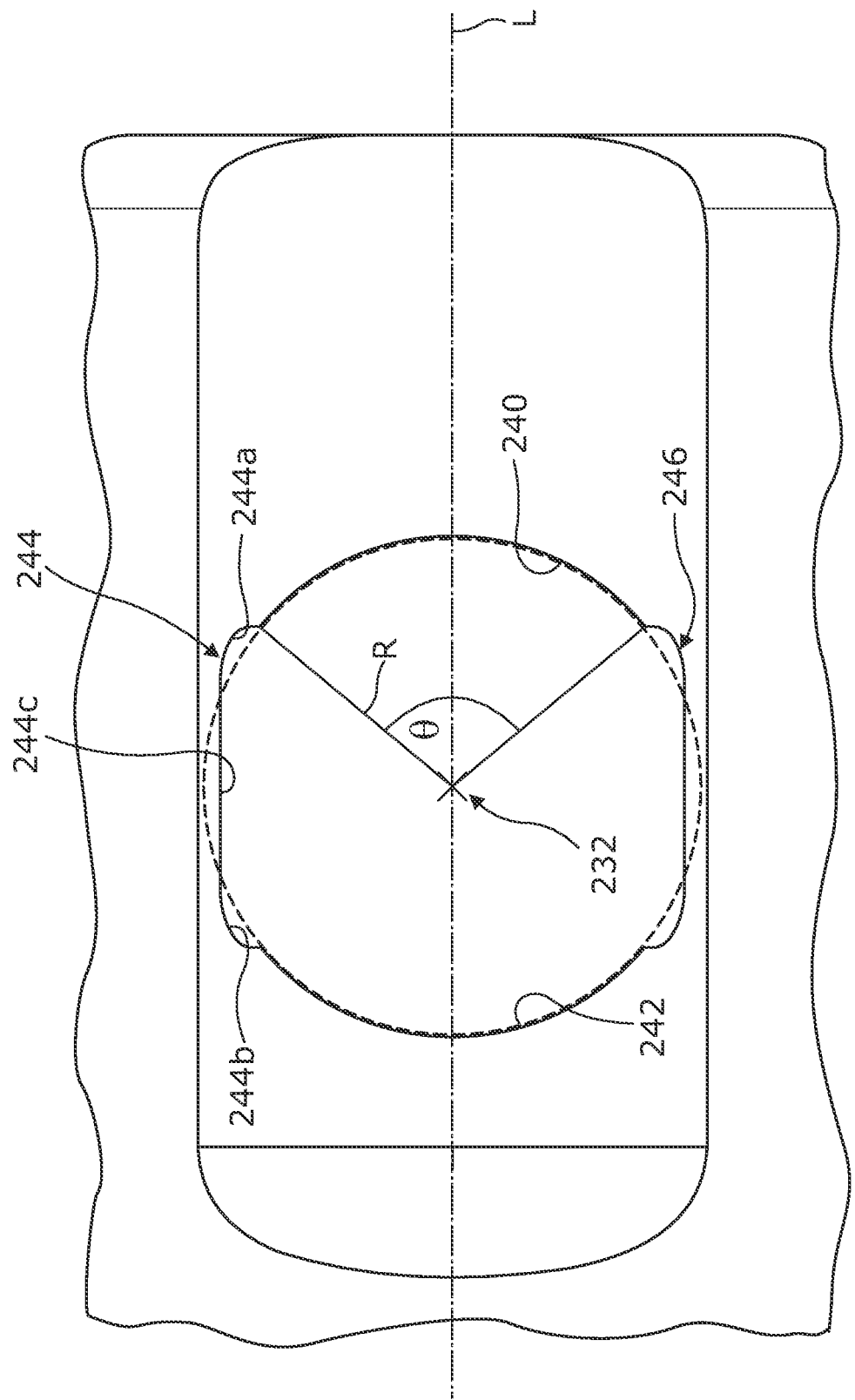
Figure 8:
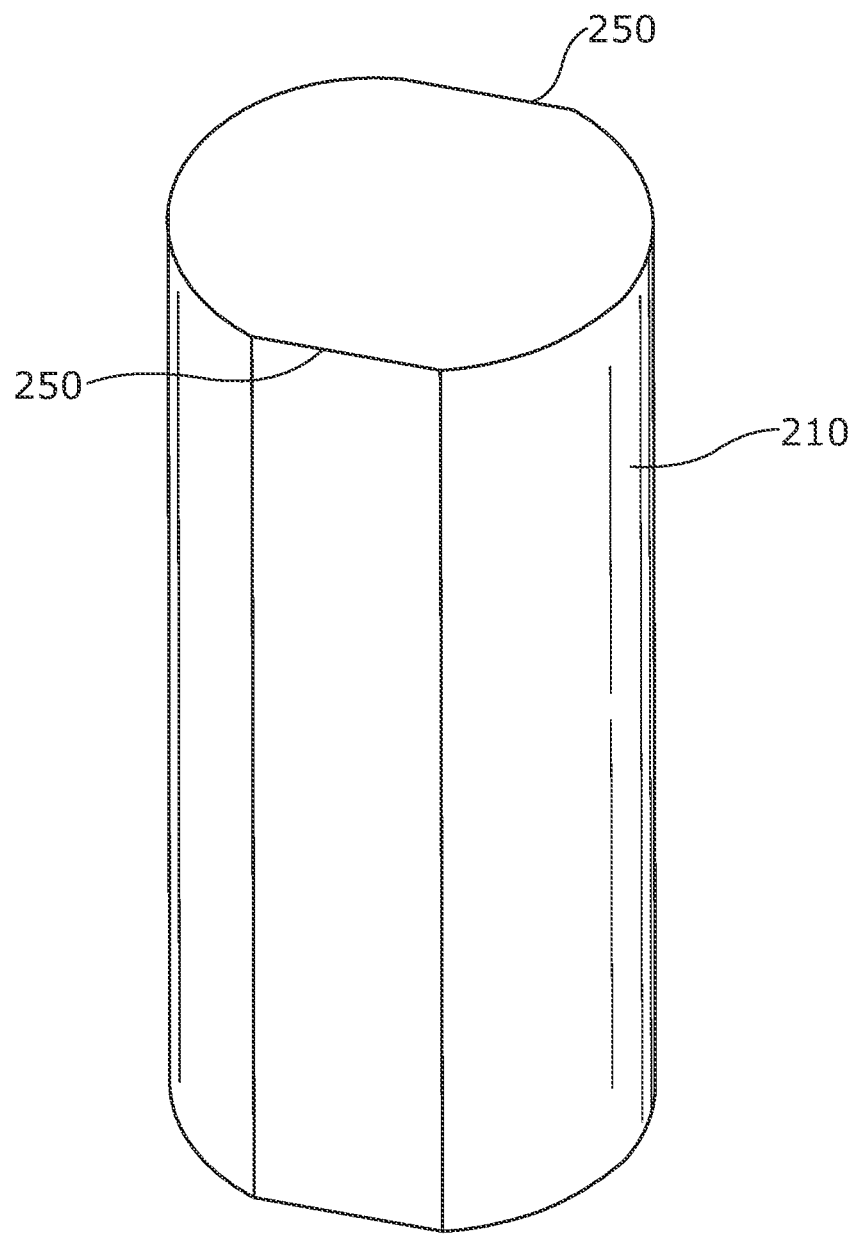
Figure 9:
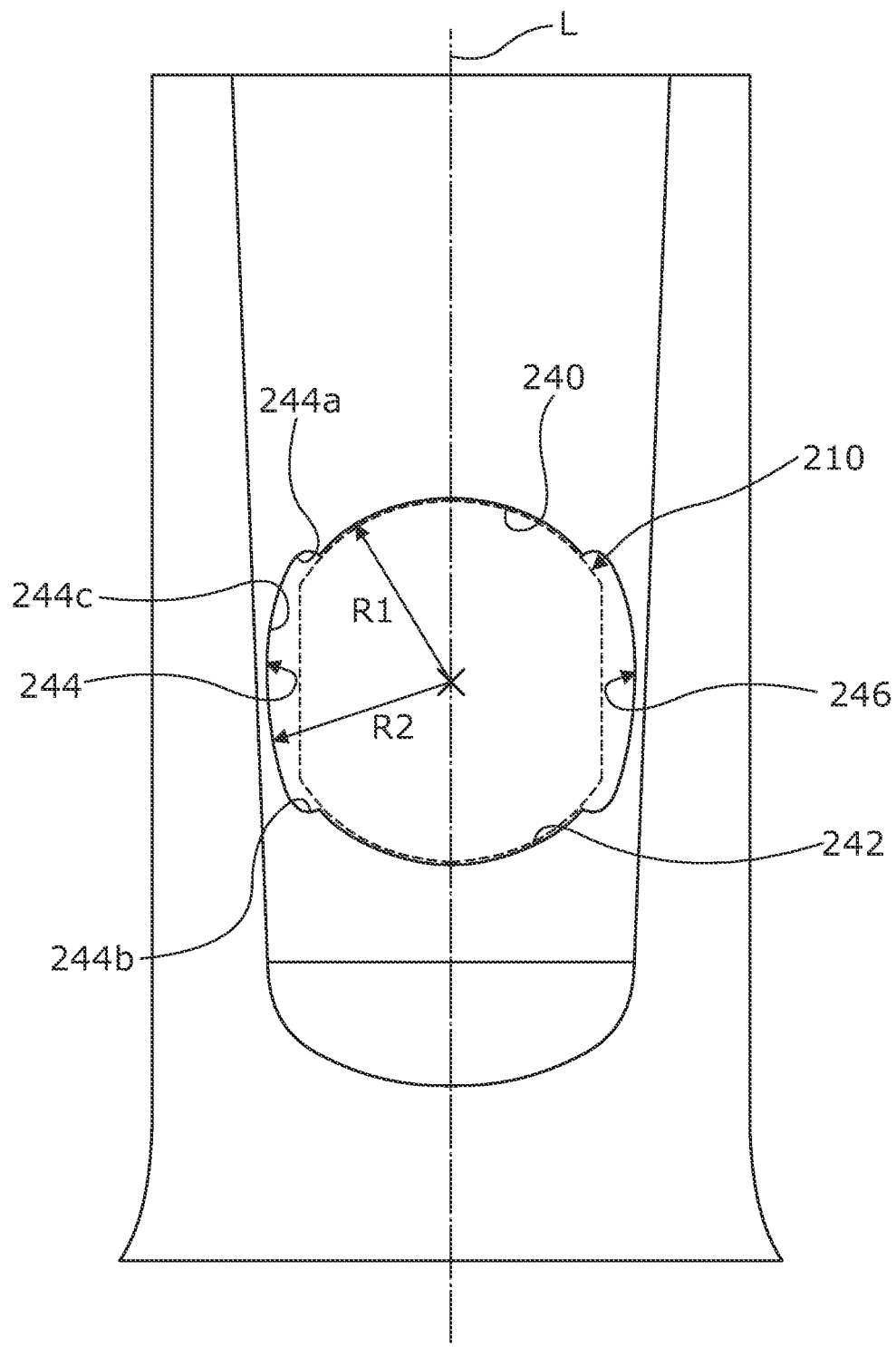

In order that the present invention may be more readily understood, embodiments of the invention will now be described, by way of non-limiting example, with reference to the remaining figures, in which;

FIG. 2 is a front view of a wind turbine, including three blades attached to a central hub via respective pitch systems, in which the invention may be incorporated;

FIG. 3 is a perspective view of a pitch system embodying the invention;

FIG. 4 is a perspective view of part of the pitch system in FIG. 3, illustrating the coupling between an actuator rod and a flange of a connecting bracket of the pitch system;

FIG. 5 is a section view corresponding to part of FIG. 4;

FIG. 6 is a view from above of a part of FIG. 4;

FIG. 7 is an enlarged view of FIG. 6, focusing on an end of the connector rod;

FIG. 8 is a perspective view of a connecting pin that serves in coupling the connector rod to the connecting bracket of the pitch system; and FIG. 9 is a view similar to that of FIG. 7, but which shows an alternative embodiment.

DETAILED DESCRIPTION OF THE EMBODIMENTS

The invention relates generally to the mechanical coupling between a pitch actuator, as described above with reference to FIG. 1 by way of an example, and the connection bracket by means of which an actuating rod of the pitch actuator is coupled to and controls the movement of the blade bearing. Due to the torque that the pitch actuator must exert on the blade bearing, the mechanical coupling is a highly stressed component that must withstand high cyclical loading patterns without exhibiting excessive fatigue. Further, the mechanical coupling should readily be able to be disassembled in such a way as to promote easy maintenance of other components of the pitch system, such as pitch actuator seals and the like, which typically have to be removed from the actuator by sliding them along and off the actuator rod.

To set the invention in better context, an exemplary wind turbine and associated pitch system will firstly be described with reference to FIGS. 2 and 3, following which a more detailed discussion will be provided about the coupling between the pitch actuator in accordance with the invention and the blade bearing.

FIG. 2 is a front view of a wind turbine 100 in which the invention may be incorporated. The wind turbine 100 comprises a tower 102, a nacelle 104 located at the top of the tower 102, and a rotor-hub assembly 106 mounted to the nacelle 104. The rotor-hub assembly 106 comprises three turbine blades 108 affixed to a central hub 110. The blades 108 are arranged to cause rotation of the rotor-hub assembly 106 when wind is incident on the blades 108. The central hub 110 is connected to a main shaft (not shown) housed in the nacelle 104, which in turn is connected to a generating system (not shown) also in the nacelle 104. The central hub 110 causes the main shaft to turn and this rotational energy is converted into electricity by the generating system.

Figure 1:
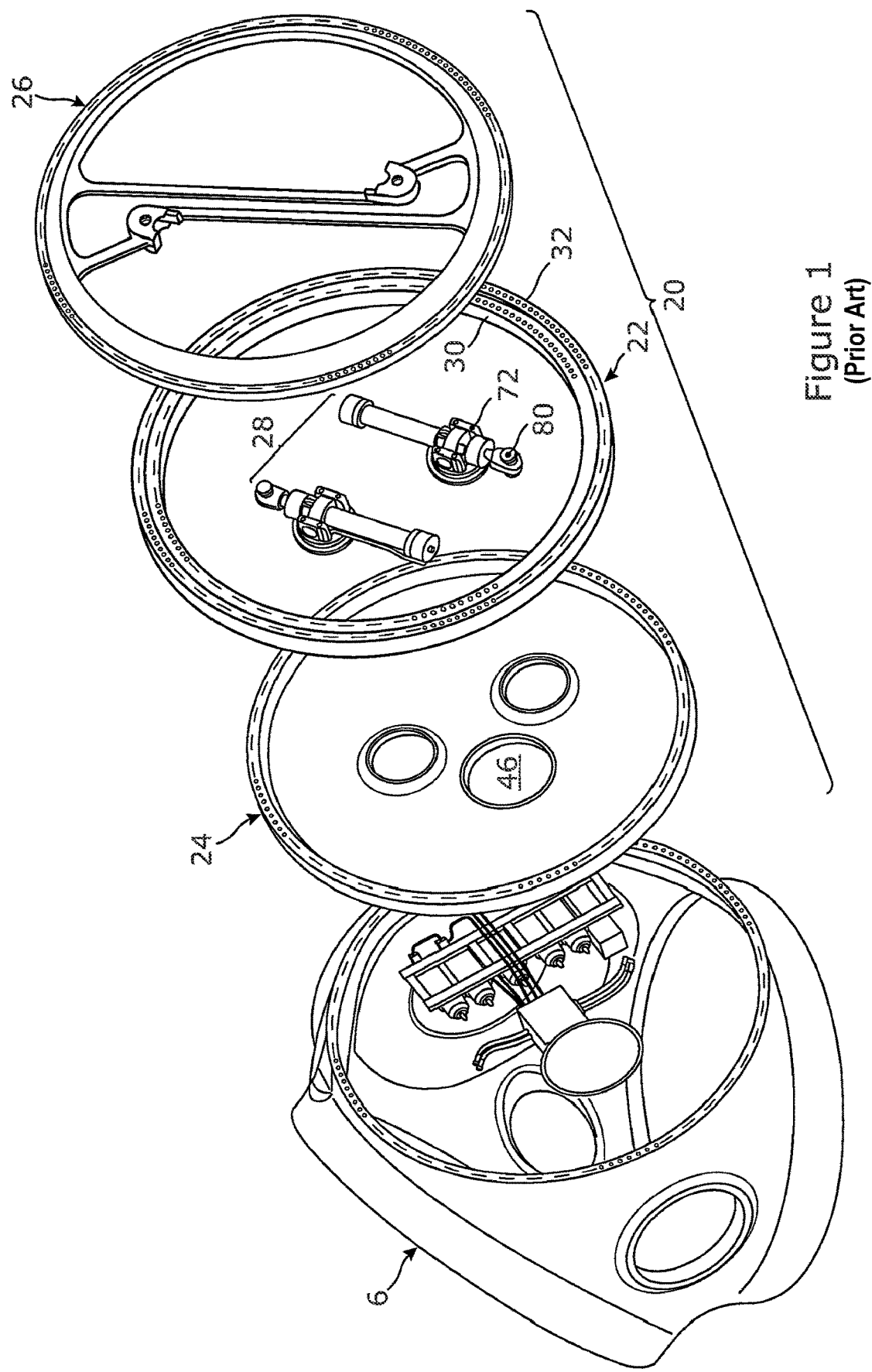
FIG. 1 has already been described by way of background, which shows an exploded perspective view of a prior art pitch system for a wind turbine.

Each wind turbine blade 108 is mounted to the central hub 6 by a pitch system similar to the pitch system described by way of background with reference to FIG. 1. Accordingly, reference to FIG. 1 should be made for the general structure of the pitch system. Further details of the pitch system can be found in WO 2012/069062, the content of which is hereby incorporated by reference.

With reference to FIG. 3, a pitch system 112 in accordance with an embodiment of the invention includes a blade bearing arrangement or assembly 114 that is mounted to the central hub 110. The hub 110 can be seen in the lower part of FIG. 3, with the bearing arrangement 114 mounted to it. It will be appreciated that the blade bearing arrangement 114 is just one of such arrangements that are mounted to the hub 110, there being one per blade.

It should be noted at this point that the invention concerns a coupling between a connecting rod of actuator of the pitch system and a connecting bracket of the blade bearing arrangement. Before discussing the specific technical details of these components, a broader discussion of the configuration of the pitch system will first be provided. However, although the pitch system described here has certain specific features, it should be appreciated that many of these features are optional when considered in context with the invention as defined by the claims.

The blade bearing arrangement 114 or, more simply, blade bearing, comprises a first bearing ring 120 and a second bearing ring 122 that are configured to rotate with respect to one another. For the purposes of this discussion, the first bearing ring 120 will be referred to as the inner bearing ring, and the second bearing ring 122 will be referred to as the outer bearing ring.

The inner and outer bearing rings 120, 122 may be arranged with conventional rolling elements such as cylindrical or tapered rollers between them in the usual way for such an application. The specific form of rolling elements or equivalent friction reduction means between the inner and outer bearing rings 120, 122 is not critical to the invention and so no further discussion will be provided here. The inner and outer bearing rings 120, 122 are oriented about and therefore define a rotational axis X for the blade bearing.

In the illustrated embodiment, the inner bearing ring 120 is fixed to the hub 110 by suitable fixings such as bolts and so it is rotationally coupled to the hub 110. Note that the fixings are not shown in the Figures, although a ring of bolt holes 123 is shown. Typically, the inner bearing ring 120 will be a separate part to the hub 110 and fixed securely to it, as this provides for more convenient manufacture. However, the inner bearing ring 120 may also be an integral part of the hub 110, such that it may be cast and/or machined from the same piece of material e.g. cast steel.

In the illustrated embodiment, the outer bearing ring 122 rotates relative to the inner bearing ring 120 and so is suitable for being connected to a blade so that the rotational position of the outer bearing ring 122 can control the pitch angle of the blade. In FIG. 3, the outer bearing ring 120 defines a ring of bolt holes 124 about its circumferential edge which serve as fixing points for a blade as would be understood by the skilled person. The blade and relevant fixings are not shown here. Beneficially, since the outer bearing ring 122 is fixed to the blade, in use, this means that for a blade root of a given diameter, the inner bearing ring 120 is of a smaller diameter which, in turn, means that the hub can be more compact.

The pitch system 112 includes an actuation system 130 which has a function of controlling relative movement between the inner and outer bearing rings 120,122. The actuation system 130 includes a first load transfer beam arrangement 132 and a second load transfer beam arrangement 134, that together provide a rotationally drivable coupling between the inner and outer bearing rings 120,122. As can be seen in FIG. 3, the first load transfer beam arrangement 132 is generally linear, in this embodiment, and spans between a first fixing position 136 and a second fixing position 138 on the inner bearing ring 120. The two fixing positions 136, 138 are separate and are diametrically opposed in this embodiment.

In a similar manner to the first load transfer beam arrangement 132, the second load transfer beam arrangement 134 is also generally linear and spans between a first fixing position 140 and a second fixing position 142 on the outer bearing ring 122. The two fixing positions 140,142 of the second load transfer beam arrangement 134 are also separate and diametrically opposed in the configuration shown in FIG. 3.

The actuation system 130 includes a pair of linear actuators 146, in the illustrated embodiment, which are coupled between the first and second load transfer beam arrangements 132, 134 and are arranged to create an angular force on the second load transfer beam arrangement 134 when operated. In this way, the outer bearing ring 122 is controlled to move rotationally with respect to the inner bearing ring 120. Here, it should be noted that a pair of linear actuators 146 are provided as this generates a more evenly distributed force on the outer bearing ring 122. Furthermore, this means that smaller actuators can be used rather than a single actuator with a larger load capacity. It is possible for the linear actuators to be embodied as pneumatic or electrically driven linear actuators, for example based on a lead screw mechanism, but for high load applications hydraulic actuators are more suitable.

Each of the first and second load transfer beam arrangements 132, 134 includes respective mounting brackets by which means they are connected between the inner and outer bearing rings 120, 122, respectively.

More specifically, the first load transfer beam arrangement 132 comprises a first mounting bracket 150, a second mounting bracket 152, and a beam or strut 154 that is coupled to and extends between the first and second mounting brackets 150, 152. The beam 154 is shown here as a compound beam, and so includes a pair of beam sections 154*a*, 154*b* although a single beam section would also be acceptable.

As can be seen in the Figures, the mounting brackets 150, 152 of the first load transfer beam arrangement 132 serve to couple respective ends of the pair of beam sections 154*a*, 154*b* to the inner bearing ring 120. The mounting brackets 150, 152 comprise a bracket base 156 and two arms 158 that converge at an apex that defines a connecting portion 160 of the mounting bracket 150. The base 156 and the arms 158 therefore provide a generally triangular form of bracket that defines an open central area 162. The configuration of the bracket 150 provides it with a degree of flexibility, particularly in a radial direction. This flexibility is able to provide some decoupling between the ovalisation of the of the inner bearing ring 120 and the beam section 154 which reduces material fatigue whilst retaining acceptable stiffness for effective actuation of the linear actuators.

The mounting bracket 150 is connected to the beam sections 154*a*, 154*b* at its connecting portion 160, where there is formed a bearing support (not shown) which is defined by an aperture which receives an e.g. spherical bearing that is connected to a mounting spindle or pin 168. The mounting pin 168 extends through the spherical bearing 166 and is fixed at each of its ends to an end of the respective beam sections 154*a*, 154*b*. The arrangement of the spherical bearing therefore provides the beam 154 with the ability to accommodate geometry changes as the actuators drive the outer bearing ring 122. The bearing support therefore provides at least two degrees of freedom in this case which allows the beam sections 154*a*, 154*b* to rotate and tilt with respect to the mounting bracket 150.

Note that the second mounting bracket 152 has the same structure as the first mounting bracket 150 in this illustrated embodiment, so for the sake of brevity further description will not be provided.

As can be seen in the Figures, the beam 154 of the first load transfer beam arrangement 132 provides a mounting point for the pair of linear actuators 146. In this example, the linear actuators 146 are hydraulic and comprise an actuator body 170 and an actuator rod 172 that is slidable in a barrel (not shown) defined in the actuator body 170 in the conventional manner. Here, the actuator bodies 170 are connected to the beam 154 and the actuator rods 172 are connected to the second load transfer beam arrangement 134.

The actuator body 170 is embraced by the two beam sections 154*a*, 154*b* which in effect acts as a flexible yoke-type coupling for the actuator body 170 which is supported by the beam sections 154*a*, 154*b* so that it is able to move angularly in a direction that is generally perpendicular to the rotational axis X of the blade bearing. Any suitable bearing may be used to rotatably support the actuator body 70. Although not shown clearly in FIG. 3, the actuator body 170 includes a pair of opposed mounting lugs (not shown) that are oriented vertically and which are received into respective sockets (not shown) defined in the beam sections 154*a*, 154*b*. This configuration of mounting therefore enables the actuator body 170 to swing sideways through a first degree of freedom, in a plane parallel to the plane defined by the blade bearing which therefore provides a flexible coupling. The interface between the sockets 176 and the mounting lugs may also be embodied as a bearing that provides multiple degrees of freedom such as a spherical bearing.

Turning to the second load transfer beam arrangement 134, this component also includes a first mounting bracket 180 and a second mounting bracket 182, and a beam or strut 184 that is coupled between them. However, in this case the two mounting brackets 180,182 are coupled to the outer bearing ring 122. Since the beam 184 is linear, in the illustrated embodiment, the first and second mounting brackets 180,182 of the second load transfer beam arrangement 134 are in approximately diametrically opposed locations. It should be noted that the beam 184 may be a single beam or it may comprise a pair of beam sections, which may be easier to mount on its respective mounting brackets.

As can be seen in the figures, the outer bearing ring 122 has a taller configuration than the inner bearing ring 120, such that an axial end face of the outer bearing ring 122 is spaced from the axial end face of the inner bearing ring 120. This comparative configuration guards against possible clashing between the fastenings on the first load transfer beam arrangement and the underside of the second load transfer beam arrangement.

Notably, due to the linear configurations of the first and second load transfer beam arrangements 132, 134 which each extend between diametrically opposed locations on the inner and outer bearing ring, respectively, it will be appreciated that the beam 184 of the second load transfer beam arrangement 134 crosses the first load transfer beam arrangement 132, when viewed along the rotational axis X of the pitch system 112. More particularly, the two beams 154, 184 cross at a point that is substantially coincident with the geometric centre of the blade bearing, as denoted by the rotational axis X.

The compound configuration of the beam sections 154a, 154b of the first load transfer beam arrangement 132 is particularly beneficial here since the beam 184 of the second load transfer beam arrangement 134 is able to pass through the space between the parallel beam sections 154a, 154b.

The mounting brackets 180,182 of the second load transfer beam arrangement 134 are identical in form, in this embodiment, so only one of them will be described in detail.

The mounting bracket 180 is plate-like in form and provides an interface to bridge between the beam 184 and the outer bearing ring 122. The mounting bracket 180 has a base section 186 which is coupled to the outer bearing ring 122 at a series of bolting locations, and an intermediate tapered portion that terminates in a connecting tongue 190 which is secured to an end of the beam 184. The connection between the connecting tongue 190 and the beam 184 may be achieved by any suitable technique, such as welding or an array of bolts as would be understood by the skilled person.

It will be appreciated from the figures that the mounting bracket 180 fixes to the outer bearing ring 122 in such a way so that the outer bearing ring 122 maintains a flat and uniform contact face for connecting to the blade. To this end, the outer bearing ring 122 is shaped to define a first and second cut-out or 'recessed' sections 194 which are shaped to match the respective base sections 186 of the mounting brackets 180, 182. The cut-out sections 194 have a depth which matches the thickness of the respective mounting bracket 180, 182. As a result, the upper surface of the mounting brackets 180, 182, and particularly the base section 186 thereof, sit substantially flush with the adjacent surface of the outer bearing ring 122. Together therefore, the axial facing surfaces of the outer bearing ring 122 and the connector brackets 180,182 provide a flat surface against which an abutting joining surface of a blade can be fixed. It should be noted that the recessed sections 194 should be considered optional. In an alternative embodiment, the outer bearing ring 122 is not provided with recessed sections and, instead, an intermediate component is provided to provide an interface between the axial end face of the outer bearing rind and the root end of the blade. That interface component would suitably be shaped to accommodate the protruding mounting brackets of the second load transfer beam arrangement.

Whereas the first load transfer beam arrangement 130 is coupled to the bodies of the linear actuators 146, the second load transfer beam arrangement 132 is coupled to the actuator rods 172. More specifically the actuator rods 172 of each of the linear actuators 146 are connected to respective ones of the mounting brackets 180,182, and the coupling between these components is shown in more detail in FIGS. 4 to 9.

FIG. 4 shows an enlarged view of where the actuator rod 172 couples to a part of a connecting portion 200 of the mounting bracket 180,182. For illustrative purposes, the mounting brackets 180, 182 shown in FIG. 4 are shaped differently in plan form to that shown in FIG. 3. However, this is immaterial in the context of the invention.

As can be seen in particularly clearly in FIGS. 4 and 5, the coupling between the actuator rod 172 of the pitch actuator and the connecting portion 200 of the mounting bracket 180, 182 is embodied as a clevis joint. As such, a clevis fork arrangement 202 is defined at the drive end of the pitch actuator which is coupled to a tang or blade member 204 which is defined by the connector portion 200.

The clevis fork arrangement 202 comprises first and second fork members 206,208 that embrace the blade member 204 which is received in a slot 209 defined between the fork members 206,208. A clevis pin 210 is received through respective holes or openings 212,214 defined in the fork members 206,208. The joint between the fork members 206,208, the blade 204 and the clevis pin 210 is configured such that the actuator rod 172 is able to move or swing freely in the plane of the blade 204, which is coincident with the longitudinal axis L of the actuator rod 172. Therefore, the clevis pin 210 is coupled to the blade 204 in this embodiment by a suitable bearing 230. The bearing 230 form shown is a spherical bearing which provides the actuator rod 172 with at least a rotational degree of freedom. However, it also provides a further degree of freedom since the actuator rod 172 is able to deviate somewhat out of that plane of movement which is advantageous in some pitch actuation systems. Although a spherical bearing is shown here, it should be noted that other bearing forms would be acceptable, for example a plain/journal bearing or a roller bearing. As can be seen from FIG. 5, the bearing 230 is received in a hole 228 defined in the blade member 204 and itself defines an opening 216 through which passes the clevis pin 210 thereby uniting the joint. As shown, the holes 212,214, 216 are aligned along a hole axis 218 which is coincident with a longitudinal axis of the clevis pin 210, and have comparable dimensions to the clevis pin 210, as will be discussed further.

The clevis fork arrangement 202 resembles a tuning fork in form and comprises a base section 220 from which the fork members 206,208 extend. The base section 220 itself defines a generally cylindrical body which has an outer diameter substantially the same as the outer diameter of the adjacent part of the actuator rod 172. As can been in the drawings however, the base section 220 of the clevis fork arrangement 202 and the actuator rod 172 have adjacent surfaces that are flush with one another. The relatively wide base section 220 then narrows sharply to define an axial projection or shaft 222 which is received into an axially extending socket 224 defined in the end of the actuator rod 172. The mating between the projection 222 and the socket 224 is such that the clevis fork arrangement 202 is held securely on the actuator rod 172 against tension forces. As such, in the illustrated embodiment the projection 222 and the socket 224 are mated by way of a threaded connection, which is beneficial because it allows the clevis fork arrangement 202 to be unscrewed and removed from the actuator rod 172 if needed, for example during maintenance.

The first and second fork members 206,208 are substantially identical, in the illustrated embodiment. As such, they extend from the body section 222 parallel to one another along the longitudinal axis L of the actuator rod 172 and terminate at respective tip ends. As can be seen in FIG. 5, the configuration of the fork members 206,208 defines an internal slot 224 within which the blade 204 of the connecting portion 200 is received.

During operation, the pitch actuator exerts linear force along the axis L of the actuator rod 172, which results in the load path going through the fork members 206,208 and the clevis pin 210, and into the blade 204. It will be appreciated therefore that the interface between the fork members 206, 208 and the clevis pin 210 experiences regions of high stress, and this can compromise the reliability of these components.

The invention proposes to configure the openings 212,214 in the fork members 206,208 to provide significant stress relief in the clevis joint 202, and particularly at the interface between the clevis openings 212,214 and the clevis pin 210.

FIGS. 6 and 7 show one of the clevis openings 212 by way of example. Both openings 212,214 can be considered identical and so reference will now be made to a single opening 212 for clarity.

As can be seen in FIGS. 6 and 7 the clevis opening 212 is non-circular in comparison with conventional openings of this type which would be circular having a diameter matching that of the clevis pin 210. The clevis opening 212 has a perimeter profile that is generally or predominantly circular with a centre, labelled as 232, that is positioned on the longitudinal axis L of the actuator rod. As shown particularly clearly in FIG. 7, the clevis opening 212, being predominantly circular, is defined in part by first and second perimeter sections that are formed as circular arcs 240,242.

Between the two circular arcs 240,242, the clevis opening 212 defines a pair of flared perimeter sections 244,246. Each of the flared sections 244,246 are identical in the illustrated embodiment, but identity is not essential. The flared sections 244,246 can therefore be considered to be respective third and fourth perimeter sections in addition to the circular first and second perimeter sections 240,242.

The first circular arc 240 is oriented such that the belly of the circular arc points towards the tip end of the clevis fork arrangement 202. Furthermore, the first circular arc 240 is centred on the longitudinal axis L such that equal portions of the length of the first circular arc 240 fall on either side of the longitudinal axis L.

The arc length of the first perimeter section 240 spans a central angle θ of approximately 100 degrees in the illustrated embodiment. Without wishing to be bound by theory, it is envisaged that the arc length of the first perimeter section 240 may span a central angle of between 60 and 120 degrees. Larger angles mean that the first perimeter section 240 provides a larger bearing surface which is beneficial for withstanding higher extreme loads, but too great an angle would result in a reduction in stress relief. Conversely, if extreme loads are predicted to be comparatively low, a small angle would be acceptable in order to increase stress relief.

The second circular arc 242 is oriented such that the belly of the circular arc is directed away from the tip end of the clevis fork arrangement 202. In the same way as the first circular arc 240, the second circular arc 242 is centred on the longitudinal axis L such that equal portions of the length of the second circular arc 242 fall on either side of the longitudinal axis L. What is more, the first circular arc 240 and the second circular arc 242 share the same geometric centre 232 and same radius of curvature R, in this embodiment. Note that in some embodiments it is envisaged that the radius of curvature of each of the circular arcs may be different.

In the illustrated embodiment, the second circular arc 242 subtends the same central angle as the first circular arc 240, which is approximately 100 degrees. However, this is not essential, and the two arc lengths can be different. This may be appropriate where the push and pull loads on the joint may be unequal.

The flared perimeter sections 244,246 provide a stress relief feature for the clevis opening 212. In use, when a high pulling force is applied to the clevis fork arrangement 202 by the actuator rod, a slight deformation of the clevis opening 212 occurs which would have the effect of causing some ovalisation in a plain circular opening. This can result in high stress forces around the side interfaces between the clevis opening 212 and the clevis pin 210 which, over time, can lead to excessive wear of these components.

Each of the flared perimeter sections 244,246 defines an enlarged clearance zone with respect to at least part of an imaginary circle defined by the nominal radius of the first perimeter section. This can be seen particularly clearly in FIG. 7 in which the flared perimeter sections 244,246 create an area where there is no contact between the perimeter of the opening 212 and the outer surface of the clevis pin 210. This should be contrasted to the known approach of circular openings and circular pins. In this known approach, the direction of applied force is aligned with the axis of the actuator rod 172 such that retraction of the actuator in effect 'pulls' the openings along that axis, which deforms the openings slightly out of a true circular shape into an oval shape. This means that the dimension of the openings in a direction perpendicular to the rod axis L reduces slightly, thereby compressing the clevis pin 110 and creating a highly stressed region which is more vulnerable to metal fatigue and stress fracturing. The highest stress points occur at diametrically opposed points on the openings taken along a line perpendicular through the rod axis. In the embodiments of the invention, however, the flared sections 244,246 provide a stress relieving function since deformation of the openings 212,214 along the rod axis during use does not create a point of stress with sliding/rubbing movement with the adjacent sides of the clevis pin 210, thereby reducing wear and fatigue. In addition, the larger radius of curvature in the critical stress points acts to reduce peak stress and enhance the strength in fatigue and extreme load events.

The flared sections 244,246 may take various forms. However, it is important that the flared sections 244,246 create a part of the opening 212 that withdraws away from the surface of the clevis pin so as to remain out of contact with that surface across the length of the fared section. Referring to one of the flared sections, labelled generally as 244, it will be appreciated that the flared section comprises two curved portions 244a,244b which are joined by an intermediate portion 244c. In this embodiment the intermediate portion 244c is linear. Together, the curved portions 244a,b and the linear portion 244c define a recess or re-entrant in the otherwise cylindrical wall of the opening 212.

In the illustrated embodiment, the cross-sectional profile of the clevis pin 210 is shaped to complement the clevis opening 212. In this respect, the clevis pin has a cross-sectional outer profile that is generally circular with a radius substantially equal to the radius of the circular arc defined by the first and second perimeter sections 240,242. However, the clevis pin 210 also defines first and second opposed facets 250. Here, as is shown particularly clearly in FIG. 8, the facets 250 are parallel to one another and extend longitudinally along the length of the clevis pin 210. In other embodiments, however, the facets 250 are not parallel. When the clevis pin 210 is viewed in the clevis opening 212, as is shown in FIG. 6, the facets 250 are aligned with respective ones of the flared sections 244,246. As such, the direction which the facets 250 extend is parallel to the longitudinal axis L of the clevis fork arrangement 202.

Although not shown clearly in FIG. 6, it should be appreciated that the relative dimensions of the clevis pin 210 and the opening 212 is such that a clearance is defined between the facets 250 and the neighbouring one of the linear portions 244c. The size of the clearance is based on the need to account for machining tolerances and for the elastic deformation of the opening.

As discussed above, the shape of the flared sections can take various forms. Another example is shown in FIG. 9, in which the opening 212 is very similar to that shown in FIG. 7, so only the differences will be described, and the same reference numerals will be used, where appropriate. In this example, the clevis opening 212 includes first and second perimeter sections 240,242 in the form of matching circular arcs, as in the previous embodiment. The position of the clevis pin 210 is shown in dashed line form. Flared sections 244,246 are provided between the first and second perimeter sections 240,242. However, it will be noted that the flared sections 244,246 do not include a linear intermediate portion which was present in the previous embodiment. Instead, the flared sections 244,246 have a profile that is a continuous curve that varies in its radius of curvature. As such, the flared sections 244,246 include first and second curved portion 244a,244b that have a relatively small radius of curvature, and an intermediate portion 244c that is also curved. Here, it will noted that the radius of curvature of the intermediate portion 244c is larger than the radius of curvature of the first and second portions 244a,b. Notably, the radius of curvature of the intermediate portion 244c, shown here as R2, is larger than the nominal radius of curvature of the clevis opening 212, when measured at the first or second circular arc section 240,242.

The clevis pin 210 may be secured in the clevis fork arrangement in any suitable manner. For example, although not shown in the figures, the exposed ends of the clevis pin 210 may carry a suitable thread which is cooperable with a respective internally threaded cap in order to maintain the clevis pin 210 in a fixed position. Alternatively, a suitable circlip fastener may be used to ensure that the clevis pin 210 is maintained in position within the clevis openings 226. Still alternatively, a fixing plate (not shown) may be secured to one or both of the clevis fork members, for example by bolts. The fixing plates could be configured to engage with a suitable securing feature such as a slot or notch on the clevis pin so as to lock the clevis pin in position.

Having discussed various features of the hole profile of the clevis openings 212,214, the discussion will now return to the fork members 206,208, with reference to FIG. 5. As can be seen in FIG. 5, the first and second fork members 206,208 extend from the base section 220 along a direction in line with the longitudinal axis L of the actuator rod 172. In appearance, the fork members 206,208 are distinct from the base section 220 because they include portions that have a smaller external dimension compared to that of the base section 220.

This can be appreciated fully by the vertical cross section view in FIG. 5 which is taken on a vertical plane in the longitudinal axis L.

When considering the relative dimensions of the fork members, the following discussion will refer to a reference frame in which the length dimension is taken along the longitudinal axis L of the actuator rod 172, the depth dimension is taken in a vertical plane, in the orientation of the figures, such that it is perpendicular to the longitudinal axis L, and the width direction is taken is perpendicular to both the length and depth directions.

As can be seen particularly in FIGS. 4 and 6, each of the first and second fork members 206, 208 has a substantially uniform width dimension along their respective lengths. Also, it is notable that the lateral dimensions of the clevis fork arrangement, when considered in a plane perpendicular to the rod axis, do not exceed the comparable dimension of the actuator rod 172. In effect, therefore, the clevis joint 202 appears to be an extension of the actuator rod. Typically, in connecting rods of such actuators, the connecting ends will be comparatively large compared to the diameter of the rod which ensures that these components are able to accommodate the significant stresses generated during operation. However, in the invention, the width dimension of the fork members does not exceed the width dimension of the actuator rod 172 which is beneficial in terms of disassembly of the unit since piston seals can simply be slipped over the actuator rod and also the clevis fork arrangement 202.

However, this dimensional uniformity is not the same in the depth dimension. Thus, it can be seen that each of the fork members 206,208 includes a flattened section 251 which has been formed through removal of material e.g. by milling. Each of the fork members therefore has a pair of curved shoulder sections 252 which flank the flattened section 251. By virtue of this configuration, the depth dimension of each of the fork members 206,208 varies along its length from a relatively deep section near to the blind end of the slot 209 to a relatively shallow section towards the open end of the slot 209, that is to say, towards the tip end of the fork members 206,208. The depth dimension of the fork members, when considered perpendicular to the rod axis L, can therefore be considered to be non-uniform along their length.

Considered another way, each of the first and second fork members 206,208 has a radially inner portion 256, when considered in the reference frame of radial movement of the pitch actuator rod, and a radially outer portion 258, wherein the depth dimension D1 of the inner portion 256 is greater than the depth dimension D2 of the radially outer portion 258. The flattened sections 251 of the fork members help to ensure an even/symmetric load is applied to the flared sections 244,246 which could otherwise lead to bending of the fork members when load is applied.

As can be seen particularly by observing FIG. 6, the clevis openings 212,214 are positioned close to the tip ends of the respective fork members 206,208. However, it is preferred that the openings are still spaced from the tip ends by a minimum distance in order for there to be a sufficient thickness of material to absorb the loadings applied by the actuator. It is envisaged that the dimension along the actuator axis between the leading edge of the first circular arc 240 and the top and of the actuator should exceed approximately 1.5 times the radius of the circular arc 240. Similarly, it is envisaged that the thickness of material around the sides of the opening should have a minimum level that is appropriate for the loadings that the actuator rod is expected to experience.

The skilled person would appreciate that the illustrated embodiment is one example of how the invention may be put into effect. Accordingly, the embodiment described herein is provided purely for illustrative purposes and is not to be construed as limiting the scope of the invention. Some variations of the illustrated embodiments have been described above, but the skilled person would understand that other variants are possible without departing from the invention as defined by the claims.

The invention claimed is:

1. A pitch actuator for a wind turbine pitch system, the pitch actuator having an actuator body and an actuator rod movable within the actuator body, the actuator rod including a drive end that is defined by a clevis fork arrangement having first fork member and a second fork member that extend in a direction along a rod axis (L) of the actuator rod and terminate at a tip end, wherein the first and the second fork members define respective clevis openings for receiving a clevis pin therethrough, said clevis openings each having an opening perimeter profile comprising:
   a first perimeter section defined by a leading circular arc that is centered on the rod axis and oriented in the direction of the tip end of the fork members, the leading circular arc defining a nominal radius (R) and a central angle of less than 120 degrees, and
   second and third flared perimeter sections that flank respective sides of the first perimeter section, each of which define an enlarged clearance zone with respect to at least part of a circle defined by the nominal radius of the first perimeter section.

2. The pitch actuator of claim 1, wherein the second and third flared perimeter sections each define at least a linear portion.

3. The pitch actuator of claim 1, wherein the second and third flared perimeter sections each define at least a curved portion that has a radius less than that of the nominal radius.

4. The pitch actuator of claim 1, wherein the opening perimeter profile further comprises a fourth perimeter section defined by a trailing circular arc that is centered on the rod axis, and which is flanked by the second and third flared perimeter sections.

5. The pitch actuator of claim 4, wherein the fourth perimeter section defines a radius that matches the nominal radius of the first perimeter section.

6. The pitch actuator of claim 4, wherein the fourth perimeter section has a central angle of less than 120 degrees.

7. The pitch actuator of claim 1, wherein each of the first and second fork members has a width dimension, perpendicular to the rod axis, wherein that width dimension is substantially uniform along the length of the first and second fork members along the rod axis.

8. The pitch actuator of claim 1, wherein each of the first and second fork members has a depth dimension, perpendicular to the rod axis, and wherein the depth dimension is non-uniform along the length of each fork member along the rod axis.

9. The pitch actuator of claim 8, wherein each of the first and second fork members has a radially inner portion and a radially outer portion, wherein the depth dimension of the radially outer portion is less than the depth dimension of the radially inner portion.

10. The pitch actuator of claim 9, wherein the depth dimension of the radially inner portion is the same or less than a depth dimension of an adjacent portion of the actuator rod.

11. The pitch actuator of claim 1, wherein the drive end is configured to be removably attached to the actuator rod.

12. A pitch system for rotating a blade of a wind turbine relative to a hub, the pitch system comprising:
   a blade bearing including an inner bearing ring and an outer bearing ring, wherein the outer bearing ring is rotatable relative to the inner bearing ring,
   an actuator system configured to control relative rotational movement between the inner bearing ring and outer bearing ring, comprising:
      a pitch actuator in accordance with claim 1, wherein the actuator rod of the pitch actuator is coupled to one of the inner bearing ring or the outer bearing ring at a connection bracket,
   wherein the connection bracket comprises a blade member received between the first and second fork members of the actuator rod, and which defines a clevis opening which is aligned with the respective openings provided in the first and second fork members, and
   wherein a clevis pin extends through the respective clevis openings of the first and second fork members and the blade member.

13. The pitch system of claim 12, wherein the clevis opening of the blade member comprises a bearing that provides at least a rotational degree of freedom of the clevis pin received therethrough.

14. The pitch system of claim 13, wherein the bearing is a spherical bearing.

15. The pitch system of claim 12, wherein the clevis pin has a cross-sectional outer profile that is generally circular with a radius substantially equal to the radius of the circular arc defined by the first perimeter section.

16. The pitch system of claim 15, wherein the clevis pin defines first and second opposed longitudinally-extending facets, and wherein the clevis pin is oriented in the respective clevis openings such that the first and second opposed longitudinally-extending facets are aligned with the rod axis.

17. A wind turbine comprising a pitch system as claimed in claim 12.

18. The pitch actuator of claim 1, wherein the second and the third flared perimeter sections do not contact the clevis pin.

* * * * *